US012689515B2

(12) United States Patent
Hurry et al.

(10) Patent No.: US 12,689,515 B2
(45) Date of Patent: Jul. 21, 2026

(54) OFFLINE ACCESS FOR VEHICLES

(71) Applicant: Visa International Service Association, San Francisco, CA (US)

(72) Inventors: Simon Hurry, Foster City, CA (US); Christian Aabye, Redwood City, CA (US); Ethan Melnick, Brooklyn, NY (US)

(73) Assignee: Visa International Service Association, San Francisco, CA (US)

( * ) Notice: Subject to any disclaimer, the term of this patent is extended or adjusted under 35 U.S.C. 154(b) by 23 days.

(21) Appl. No.: 18/843,630

(22) PCT Filed: Feb. 9, 2023

(86) PCT No.: PCT/US2023/062267
§ 371 (c)(1),
(2) Date: Sep. 3, 2024

(87) PCT Pub. No.: WO2023/172800
PCT Pub. Date: Sep. 14, 2023

(65) Prior Publication Data
US 2025/0219833 A1     Jul. 3, 2025

Related U.S. Application Data

(60) Provisional application No. 63/317,401, filed on Mar. 7, 2022.

(51) Int. Cl.
*H04L 9/32* (2006.01)
*H04L 9/08* (2006.01)

(52) U.S. Cl.
CPC .......... *H04L 9/3213* (2013.01); *H04L 9/0825* (2013.01); *H04L 9/3247* (2013.01); *H04L 9/3263* (2013.01); *H04L 2209/84* (2013.01)

(58) Field of Classification Search
None
See application file for complete search history.

(56) References Cited

U.S. PATENT DOCUMENTS 10,579,995 B2     3/2020   de Oliveira et al.
10,846,694 B2    11/2020   Wong et al.
(Continued)

FOREIGN PATENT DOCUMENTS

CN          107871353 A      4/2018
CN          108069298 A      5/2018
(Continued)

OTHER PUBLICATIONS

PCT/US2023/062267 , "International Search Report and Written Opinion", May 30, 2023, 9 pages.
(Continued)

*Primary Examiner* — Raqiul A Choudhury
(74) *Attorney, Agent, or Firm* — Kilpatrick Townsend & Stockton LLP

(57)                    ABSTRACT

A method includes transmitting an authorization request message with a credential or a token associated with a first user to an authorizing entity computer, and then receiving, from the authorizing entity computer, an authorization response message; and responsive to receiving the authorization response message. The method also includes transmitting the credential or the token to a vehicle. The first user is able to access the vehicle by presenting a user device that contains the credential or token to the vehicle.

20 Claims, 5 Drawing Sheets

(56) References Cited

U.S. PATENT DOCUMENTS

| | | | |
|---|---|---|---|
| 2016/0055699 A1 | 2/2016 | Vincenti | |
| 2018/0337923 A1* | 11/2018 | Tanimoto | G06F 21/305 |
| 2019/0088059 A1 | 3/2019 | Santhosh et al. | |
| 2019/0356489 A1 | 11/2019 | Palanisamy | |
| 2020/0059787 A1 | 2/2020 | Whitaker et al. | |
| 2020/0167579 A1 | 5/2020 | Boye | |
| 2020/0275267 A1* | 8/2020 | Wang | H04L 9/3247 |
| 2021/0226802 A1 | 7/2021 | Zhu et al. | |
| 2021/0350336 A1* | 11/2021 | Vanderveen | G06Q 10/06311 |
| 2022/0085846 A1* | 3/2022 | Attaran | H04B 5/77 |
| 2022/0126859 A1* | 4/2022 | Luo | B60W 60/001 |
| 2022/0364871 A1* | 11/2022 | Yashiro | G06Q 10/02 |
| 2022/0374592 A1* | 11/2022 | Glase | G06F 3/04842 |
| 2023/0090549 A1* | 3/2023 | Kang | H04L 67/1021 709/219 |
| 2023/0124498 A1* | 4/2023 | Agrawal | G06F 21/57 713/194 |

FOREIGN PATENT DOCUMENTS

| | | |
|---|---|---|
| WO | 2017207644 A1 | 12/2017 |
| WO | 2018160863 A1 | 9/2018 |

OTHER PUBLICATIONS

EP23767554.1 , "Extended European Search Report", Aug. 11, 2025, 11 pages.

* cited by examiner

OFFLINE ACCESS FOR VEHICLES

CROSS-REFERENCES TO RELATED APPLICATIONS

This application is a National Stage of International Application No. PCT/US2023/062267, filed Feb. 9, 2023, which claims priority to U.S. provisional application No. 63/317,401, filed on Mar. 7, 2022, which are herein incorporated by reference in their entirety.

BACKGROUND

A number of steps and communications are involved when a second user allows a first user to use a vehicle that is associated with the second user. For example, if a first user wants to use a vehicle owned by second user, the first user needs to contact the second user. After the first user contacts the second user, the first user will need to meet with the second user in person so that the second user can provide the first user with the access token (e.g., a key or a key fob) that is needed to access the vehicle. This is inconvenient for the first user and the second user.

Also, the second user also runs the risk that the first user might lose, steal, or damage the access token that was given to the first user. If the first user loses, steals or damages the access token, the second user will need to replace all of the key fobs for the vehicle or change the locking mechanism for the vehicle. In both cases, the burden, inconvenience, and expense incurred by the second user can be significant. In addition, the use of specially designed keys and key fobs to access vehicles is cumbersome.

Embodiments of the invention address these and other problems, individually and collectively.

BRIEF SUMMARY

One embodiment includes a method comprising: transmitting, by the server computer an authorization request message comprising a credential or a token associated with a first user to an authorizing entity computer; receiving, by the server computer from the authorizing entity computer, an authorization response message; and responsive to receiving the authorization response message, transmitting, by the server computer the credential or the token to a vehicle, wherein the first user is able to access the vehicle by presenting a user device that contains the credential or token to the vehicle.

Another embodiment includes a server computer comprising: a processor; and a computer readable medium comprising code, executable by the processor, for performing a method comprising: transmitting an authorization request message comprising a credential or a token associated with a first user to an authorizing entity computer; receiving, from the authorizing entity computer, an authorization response message; and responsive to receiving the authorization response message, transmitting the credential or the token to a vehicle, wherein a first user is able to access the vehicle by presenting a user device that contains the credential or token to the vehicle.

Another embodiment of the invention includes a method comprising: receiving, by a vehicle, a credential or token from a user device; determining, by the vehicle, that the credential or the token was previously received from a server computer; performing, by the vehicle, an offline data authentication process with the user device; and allowing access to the vehicle after the offline data authentication process is performed.

Yet another embodiment of the invention includes a vehicle comprising: a processor; and a computer readable medium comprising code, executable by the processor to implement a method comprising receiving, by a vehicle, a credential or token from a user device, determining, by the vehicle, that the credential or the token was previously received from a server computer, performing, by the vehicle, an offline data authentication process with the user device, and allowing access to the vehicle after the offline data authentication process is performed.

These and other embodiments are described in detail below.

DETAILED DESCRIPTION

Figure 1:
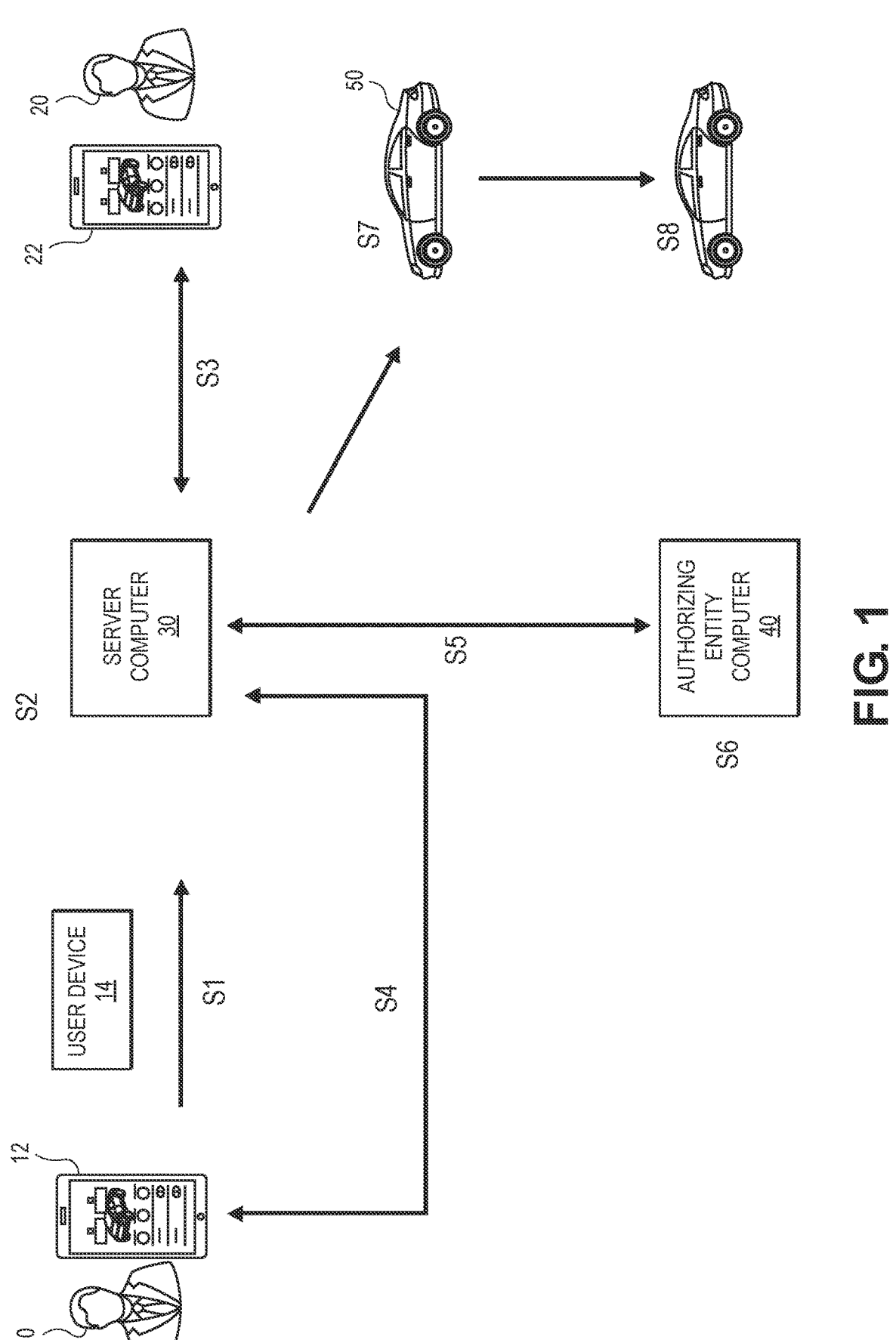
FIG. 1 shows a diagram illustrating a system and an overlaid method according to embodiments of the invention.

Prior to discussing embodiments of the invention, some terms can be discussed.

A "vehicle" can be something that can be a device that moves. Examples of vehicles include cars, boats, trucks, boats, tractors, forklifts, air taxis, and the like.

A "communication device" may be a portable device that can be transported and be operated by a user, and may include one or more electronic components (e.g., an integrated chip, etc.). A communication device according to an embodiment of the invention may be in any suitable form including, but not limited to a mobile phone (e.g., smart phone, cellular phone, etc.), a tablet computer, a portable media player, a personal digital assistant device (PDA), a wearable communication device (e.g., watch, bracelet, glasses, etc.), an electronic reader device, a laptop, a table computer, etc. A communication device may also be in the form of a vehicle (e.g., a car) equipped with communication capabilities.

Communication devices according to embodiments of the invention can be configured to communicate with external entities such as remote communication gateways through long range communications technologies and protocols. They may also be configured to communicate with external entities such as access devices using any suitable short or medium range communications technology including Bluetooth (classic and BLE-Bluetooth low energy), NFC (near field communications), IR (infrared), Wi-Fi, etc.

A "user device" may be a device that can be operated by a user. A user device can be a portable transaction device may include a storage technology (e.g., electronic memory, magnetic stripe, etc.) to store credentials or tokens associated with an account of a user. A portable transaction device can be in any of the forms described above with respect to the portable communication device, or in the form of a card (e.g., integrated chip card, magnetic stripe card) or a fob, etc. In some embodiments, the user device and the communication device may be the same device, and need not be separate devices. Specific examples of user devices can include wearable devices, payment cards such as credit, debit, and prepaid cards, vehicles with remote communication capabilities, etc.

A "server computer" may include a powerful computer or cluster of computers. For example, the server computer can be a large mainframe, a minicomputer cluster, or a group of servers functioning as a unit. In one example, a server computer may be a database server coupled to a Web server. A server computer may comprise one or more computational apparatuses and may use any of a variety of computing structures, arrangements, and compilations for servicing the requests from one or more client computers.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

A "value credential" may be information associated with worth. Examples of value credentials include payment credentials, coupon identifiers, information needed to obtain a promotional offer, etc.

A "payment credential" may include any suitable credential that can be used to conduct a payment transaction. Such information may be directly related to the account or may be derived from information related to the account. Examples of account information may include a PAN (primary account number or "account number"), username, expiration date, CVV (card verification value), dCVV (dynamic card verification value), CVV2 (card verification value 2), CVC3 card verification values, etc.

An "account identifier" may include an identifier for an account, and can be an example of a payment credential or a value credential. An account identifier may include an original account identifier associated with a payment account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

An "application" may be computer code or other data stored on a computer readable medium (e.g., memory element or secure element) that may be executable by a processor to complete a task.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN) and/or an expiration date. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g., a token) that may be associated with the payment account identifier.

A "token provider" or "token service system" can include a system that services payment tokens. In some embodiments, a token service system can facilitate requesting, determining (e.g., generating) and/or issuing tokens, as well as maintaining an established mapping of tokens to primary account numbers (PANs) in a repository (e.g., token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the token to obtain the actual PAN. In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

"Token expiry date" may refer to the expiration date/time of the token. The token expiry date may be passed among the entities of the tokenization ecosystem during transaction processing to ensure interoperability. The token expiration date may be a numeric value (e.g., a 4-digit numeric value). In some embodiments, the token expiry date can be expressed as a time duration as measured from the time of issuance.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer."

An "authorizing entity" may be an entity that authorizes a request. Examples of an authorizing entity may be an issuer, a governmental agency, a document repository, an access administrator, etc. An authorizing entity may operate an authorization computer. An "issuer" may refer to a business entity (e.g., a bank) that issues and optionally maintains an account for a user. An issuer may also issue payment credentials stored on a user device, such as a cellular telephone, smart card, tablet, or laptop to the consumer.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "public key" may include an encryption key that may be shared openly and publicly. The public key may be designed to be shared and may be configured such that any information encrypted with the public key may only be decrypted using a private key associated with the public key (i.e., a public/private key pair).

A "private key" may include any encryption key that may be protected and secure. A private key may be securely stored at an entity and may be used to decrypt any information that has been encrypted with an associated public key of a public/private key pair associated with the private key.

A "public/private key pair" may refer to a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. In some embodiments, the public key may be authorized by a body known as a Certification Authority (CA) which stores the public key in a database and distributes it to any other entity which requests it. The private key can typically be kept in a secure storage medium and will usually only be known to the entity. Public and private keys may be in any suitable format, including those based on Rivest-Shamir-Adleman (RSA) or elliptic curve cryptography (ECC).

A "local data connection" can include a short range communication connection between two or more devices that are intended to interact with each other. A local data connection can be formed using an RF mode of communication such as near field communications (NFC), Bluetooth, Bluetooth Low Energy (BLE), etc. In other embodiments, another mode of communication such as light (e.g., infrared) or audio signals may be used.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

One embodiment includes a method. The method comprises receiving, by a server computer from a first communication device, an access request message comprising a second user identifier from a second user to access a vehicle associated with a second user. In some embodiments, the vehicle can be a car. The second user can be an owner of the car, and the first user can be a person that wants to borrow the car. The second user identifier could be a phone number, e-mail address, unique user ID, or name of the second user.

After receiving the access request message, the server computer can identify the vehicle owned by the second user by performing a lookup with the second user identifier in a database. For example, if the vehicle is a car, using the phone number of the second user, the server computer can identify an account of the second user, and a VIN (vehicle identification number) associated with the second user's car. The server computer can then contact the second user and obtain the second user's approval to loan the car to the first user. The server computer can then contact the first user to obtain a credential or token from the first user.

The server computer can then transmit an authorization request message comprising a credential or a token associated with the first user to an authorizing entity computer, and then receive, from the authorizing entity computer, an authorization response message. The authorizing entity computer can be an issuer computer that manages an account of the second user. The account may be identified by the credential or the token.

Responsive to receiving the authorization response message, the server computer can transmit to the vehicle, the credential or the token. If the vehicle is a car, then the credential or token can be transmitted to the vehicle. The first user is then able to access the vehicle by presenting a user device that contains the credential or token to the vehicle. In some embodiments, an ODA (offline data authentication) process can be used.

FIG. 1 shows a system with an overlaid method illustrating embodiments of the invention. FIG. 1 shows a first user 10 that operates a first communication device 12 and a user device 14. The first user 10 may communicate with a second user 20 that operates a second communication device 22. In some embodiments, the first communication device 12 can be a first mobile phone operated by the first user 10, while the second communication device 22 can be a second mobile phone operated by the second user 20. In some embodiments, the first user 10 can be remotely located with respect to the second user 20.

The user device 14 could be a separate physical device such as a card with a credential or token stored on it. Alternatively, the user device 14 can be the same as the first communication device 12. For example, the user device 14 could be a mobile phone with a credential or token stored in an application (e.g., a digital wallet application or a vehicle maker application on the mobile phone. In this example, the user device 14 can function as the first communication device 12, and vice-versa.

A server computer 30 can be in communication with the first communication device 12, the second communication device 22, and a vehicle 50. The server computer 30 can also be in communication with an authorizing entity computer 40. The authorizing entity computer 40 can authorize or decline authorization request messages that include a credential or token, and can determine if the first user 10 will or will not be able to access the vehicle 50.

In some embodiments, other computers such as a transport computer (e.g., an acquirer computer) and a processing computer (e.g., in a processing network such as a payment processing network can be between (in an operational sense) the server computer 30 and the authorizing entity computer 40.

The entities in FIG. 1 may communicate using any suitable communications networks. Suitable communications networks may be any one and/or the combination of the following: a direct interconnection; the Internet; a Local Area Network (LAN); a Metropolitan Area Network (MAN); an Operating Missions as Nodes on the Internet (OMNI); mesh networks, a secured custom connection; a Wide Area Network (WAN); a wireless network (e.g., employing protocols such as, but not limited to a Wireless Application Protocol (WAP), I-mode, and/or the like); and/or the like.

Methods according to embodiments can be explained in detail with reference to the process flow in FIG. 1. In FIG. 1, a method can allow the second user 20 (e.g., an owner) to loan a vehicle 50 such as a car to a first user 10 (e.g., a borrower) without the exchange of any physical keys or key fobs. Each of the first user 10 and the second user 20 may operate respective first and second communication devices 12, 22 (e.g., mobile phones), each of which have an application that will allow them to communicate with each other and the server computer 30. In some embodiments, the application may be associated with the vehicle 50 and may allow an end user to interact with the manufacturer of the vehicle (e.g., via the server computer 30) as well as the vehicle itself. For example, the application could be maintained by a manufacturer of the vehicle, and can allow the owner of a vehicle made by that manufacturer to schedule maintenance for the vehicle 50, monitor the performance of the vehicle 50, receive communications (e.g., recall notifications) from the manufacturer of the vehicle 50, etc.

In step S1, the first user 10 can open the application on the first communication device 12. The first user 10 may go to a "borrow vehicle" section of the application. In that section, the first user 10 can enter a second user identifier such as the phone number associated with the second communication device 22 of the second user 20 (or other identifying information about the second user 20 or the second user's vehicle 50) into the application. The first user 10 may also specify a length of time (e.g., a week) that the first user 10 wants to borrow the vehicle 50. A price for the use of the vehicle 50 during the specified time period can be provided by the first user 10 or can be suggested by the application on the first communication device 12. The price specified by the by the first user 10 may be the amount that the first user 10 is willing to pay to borrow the vehicle 50. This information may be transmitted from the first communication device 12 to the server computer 30 in an access request message comprising the second user identifier. The server computer 30 can receive the access request message comprising the second user identifier from the second user 20.

In step S2, the server computer 30 can identify the vehicle 50 (e.g., by identifying the VIN or vehicle identification number associated with the phone number of the second user 20. The VIN, the second user's phone number, and a communication address for the vehicle 50 (e.g., an IP address, a phone number, etc.) may be linked in a database at the server computer 30.

In step S3, the server computer 30 can transmit a request to the application on the second communication device 22 operated by the second user 20, asking if the second user 20 is willing to loan the second user's vehicle 50 to the first user 10. The amount that the first user 10 is willing to pay for the loan of the vehicle 50 can also be displayed.

The second user 20 can then approve of the use of the vehicle 50 by the first user 10. As noted above, the second user 20 may obtain a fee for the loan of their vehicle 50 to the first user 10. In other embodiments, the second user 20 may not obtain a fee for the loan of their vehicle to the first user 10 (e.g., in the case of a valet or family member temporarily taking possession of the vehicle).

In step S4, upon receiving the approval from the second user 20, the server computer 30 can then communicate with the first user 10 via the application on the first communication device 12. The application may request the first user's credential (e.g., a payment credential such as a credit card number) or token and may receive the same from the first user 10 if it is not already stored in the application or the first communication device 12. If a payment is needed, the application may show the amount that the first user 10 needs to pay to use the vehicle 50. The application on the first communication device 12 may also request other information such as a driver's license and proof of insurance from the first user 10 before allowing the process to continue. The first communication device 12 can be used to take pictures of this information for submission to the server computer 30 for verification.

In step S5, after the server computer 30 receives the information including the user's credential or token, and optional driver's license and insurance data from the first communication device 12, the server computer 30 can verify the credential or token, the driver's license, and insurance data. In some cases, the server computer 30 may communicate with external entities (e.g., the issuer of the credential or token, the DMV or insurance company) to confirm that the data provided by the first user are valid and not expired. After the server computer 30 validates the information, it may generate an authorization request message comprising the credential or the token, and the amount of the transaction, and may send the same to an authorizing entity computer 40 operated by an authorizing entity (e.g., a bank used by the first user) to confirm that the credential or token (or account associated therewith) is in good standing (e.g., has sufficient funds and has not been compromised). The authorization request message may optionally pass through a transport computer and a processing network computer before it is received by the authorizing entity computer. The transport computer can be operated by an acquirer that holds an account associated with the server computer 30. The processing network computer can be a computer in a payment processing network. The processing network can function as a hub for various transport computers and authorizing entity computers.

In some embodiments, the processing network may include data processing subsystems, networks, and operations used to support and deliver authorization services, exception file services, transaction scoring services, and clearing and settlement services. An exemplary transaction processing system may include VisaNet™. Transaction processing systems such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

In some embodiments, the credential or token may be associated with a physical payment device (e.g., a phone, a payment card, etc.) that will be used by the first user 10 to access the vehicle 50. For example, the physical payment device can be the user device 14, which may in the form of a card (e.g, a credit card, a debit card, a stored value card, etc.) with the credential or token stored on it.

In some embodiments, if there is no fee for the vehicle loan, the authorization request message may comprise a zero dollar, no dollar, or nominal amount. In other embodiments, the account of the first user 10 can be charged for the loan amount, and the loan amount of a portion of it can eventually be transferred to an account (e.g., a credit card account of the second user for a card on file with the application) of the second user 20.

In step S6, the authorizing entity computer 40 can then verify that the payment credential is in good standing and can return an authorization response message to the server computer 30. The authorizing entity computer 40 determine if there are sufficient funds in the account associated with the user device 14, and can also authenticate the first user 10 or the user device 14. The authorizing entity computer 40 can also perform various fraud analysis to determine if the credential or token is suspicious (e.g., stolen).

In step S7, after the server computer 30 receives the authorization response message from the authorizing entity computer 40 that indicates that the authorization request message was approved, the server computer 30 can transmit the credential or token, or a derivative thereof (e.g., a hash of the payment credential) to the vehicle 50. The vehicle 50 can then store the payment credential or derivative thereof in a secure memory in the vehicle 50. The server computer 30 may also store and optionally transmit details of the transaction, such as the name of the first user 10 and the length of time that the first user 10 is allowed to use the vehicle 50, to the vehicle 50. This information can later be used by the server computer 30 and/or the vehicle 50 to perform various operations such as deleting the credential or token that was provided to the vehicle 50.

Figure 2:
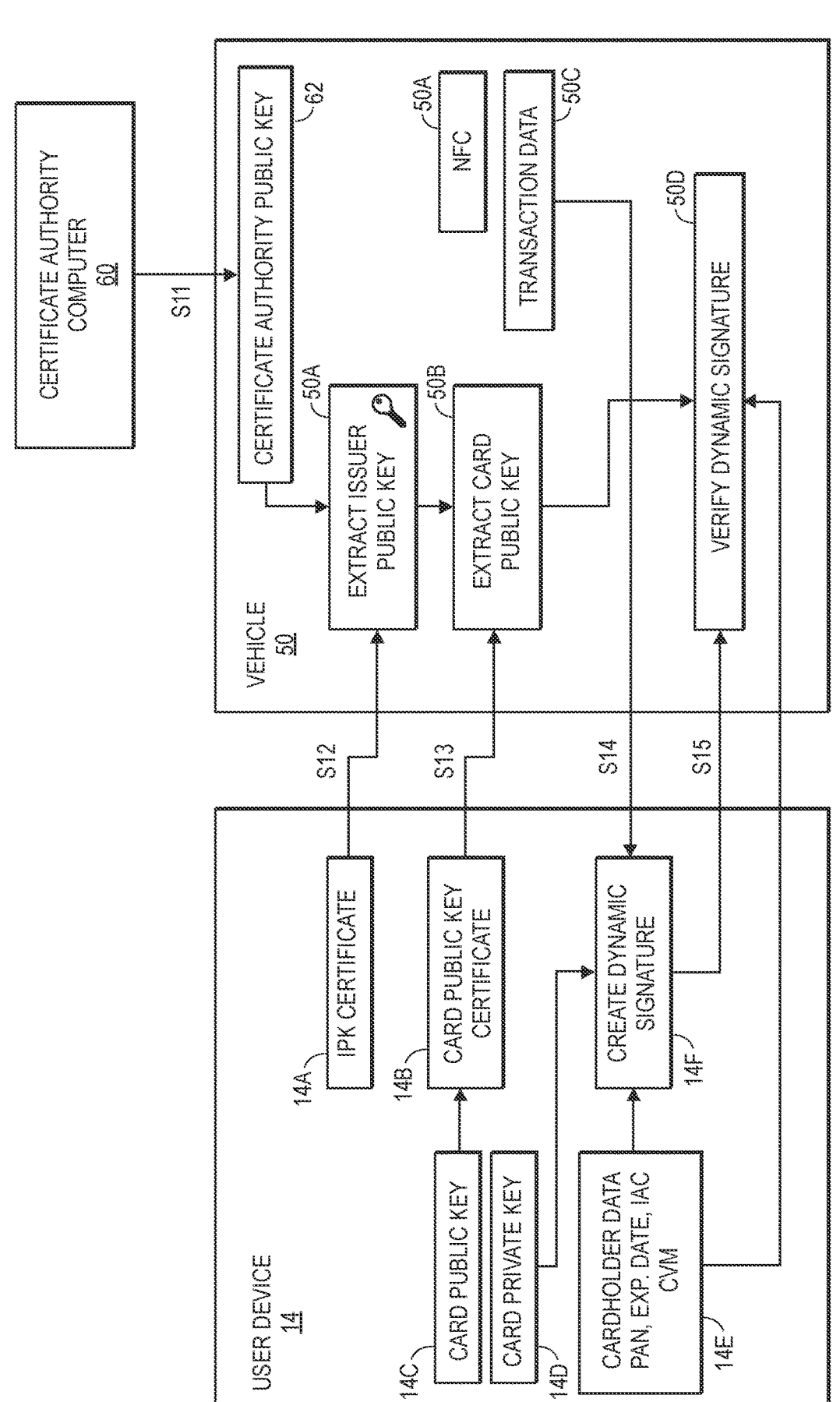
FIG. 2 shows steps in an offline data authentication process.

In step S8, the first user 10 may then attempt to access the vehicle 50 owned by the second user 20 using the user device 14 that contains the credential or token. When the first user 10 attempts to enter the vehicle 50, the first user 10 may interact the user device 14 with a device reader (e.g., an RF reader) in the vehicle 50 using a short range communication protocol. The device reader on the vehicle can read the credential or the token from the user device and can check to see that the payment credential matches the payment credential that was received from the vehicle manufacturer server computer. In some cases, the payment device could form a derivative (e.g., a hash) of the payment credential and this may be transmitted to the vehicle instead of the payment credential. Additional offline data authentication processing can then take place as shown in FIG. 2. Once authentication processing by the vehicle 50 is completed, the first user 10 can then enter the vehicle 50 and operate the vehicle 50. For example, tapping the user device 14 against a card reader that is proximate a door handle on the vehicle 50 can cause the door of the vehicle to unlock and can allow the first user 10 to enter the vehicle 50 and operate it.

FIG. 2 shows a flow diagram illustrating the use of offline data authentication (ODA) when a user device 14 interacts with a vehicle 50. The user device 14 can be an access card such as a payment card. The user device 14 and the vehicle 50 can interact using a short range communication medium and protocol (e.g., NFC) and a local data connection.

In step S11, prior to the interaction with the user device 14, the vehicle 50 receives a public key certificate with a certificate authority public key 62 from a certificate authority computer 60. The certificate authority computer 60 can be operated by a processing network such as a payment processing network.

In step S12, the user device 14 can be placed close to a reader in the vehicle 50, and the vehicle 50 can obtain an issuer public key certificate 14A (an example of an authorizing entity public key certificate) from the user device 14. Also, as described above, the user device 14 can also provide the same credential or token that was in the authorization request message in step S5 in FIG. 1 and that was downloaded to the vehicle 50 in step S7 in FIG. 1, to the vehicle 50. The vehicle 50 can then match the credential or token received in step S7 to the credential or token received from the user device 14. If there is a match, then the ODA process can continue. If there is no match, the vehicle 50 will not allow the user of the user device to access the vehicle 50.

The vehicle 50 can verify that the issuer public key certificate is trusted by verifying a digital signature therein using the certificate authority public key 62. Once the issuer public key certificate is verified, the vehicle 50 may then extract the issuer public key 50A (an example of an authorizing entity public key) from the issuer public key certificate 14A.

In step S13, the vehicle 50 may also receive a user device public key certificate 14B from the user device 14. After the user device 14 receives the user device public key certificate 14B, it may verify that it is authentic using the issuer public key 50A. The vehicle 50 can use the issuer public key 50A to verify a digital signature in the user device public key certificate 14B. The digital signature can be from the issuer of the user device 14 and can be created using the issuer's secret key.

In step S14, the vehicle may then send some dynamic data (e.g., a nonce, counter, timestamp, etc.) 50B and/or static data (e.g., a vehicle ID) to the user device 14 and the user device 14 may sign the data 50C along with other data (e.g., a credential or token) 14E from the user device 14 using a private key 14D on the user device 14 to create a dynamic signature 14F (e.g., a digital signature based on dynamic data such as counter, time, date, etc.).

In step S15, the vehicle 50 may receive the dynamic signature 50D from the user device 14 along with the other data, and can verify the dynamic signature 50D using the public key 14C of the user device 14.

The ODA (offline data authentication) process in FIG. 2 proves that the user device 14 being used to access the vehicle 50 was the user device 14 that was used to pay for the use of the vehicle 50. The ODA process also proves that the user device 14 is authentic and is trusted by the issuer of the user device 14 and the certificate authority operating the certificate authority computer 60. The use of ODA in the process of accessing a vehicle improves security, and is also more convenient than conventional methods that may use special key fobs or keys. The ODA process can verify that the user device 14 that is used to access the vehicle 50 is genuine and is not counterfeit. In embodiments of the invention, a single user device can be used to access vehicles as well as perform other unrelated functions such as conducting payments for goods and services.

Once the time period for the first user 10 to use the vehicle 50 is expired, the server computer 30 and/or the vehicle 50 can delete the credential or token associated with the first user 10. After the time has expired, the first user 10 will no longer be able to use the user device 14 to access the vehicle 50.

Figure 3:
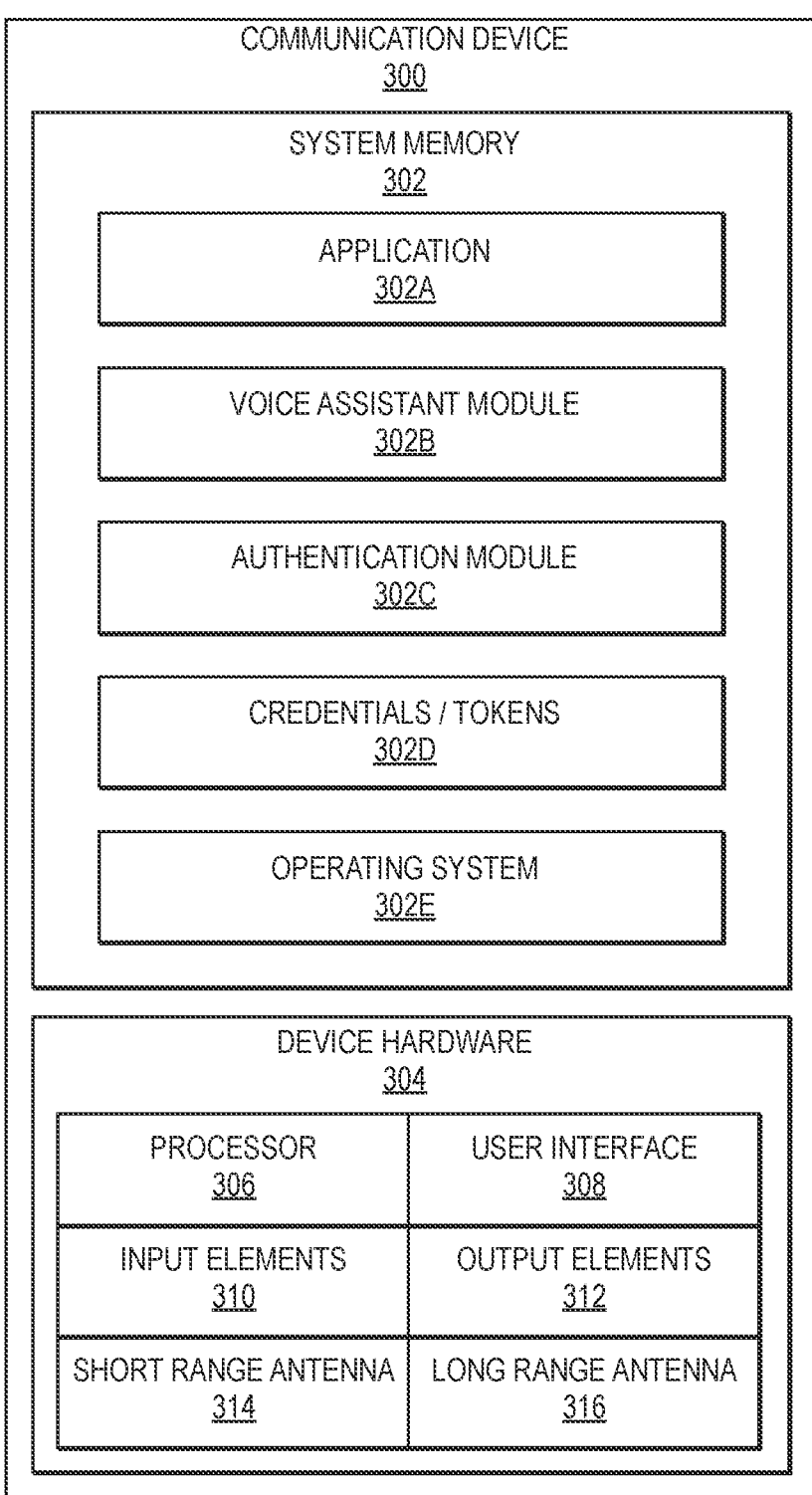
FIG. 3 shows a block diagram of a communication device according to an embodiment.

FIG. 3 illustrates a mobile communication device 300 according to an embodiment. Mobile communication device 300 may include device hardware 304 coupled to a system memory 302.

Device hardware 304 may include a processor 306, a short range antenna 314, a long range antenna 316, input elements 310, a user interface 308, and output elements 312 (which may be part of the user interface 308). Examples of input elements may include microphones, keypads, touchscreens, sensors, etc. Examples of output elements may include speakers, display screens, and tactile devices. The processor 306 can be implemented as one or more integrated circuits (e.g., one or more single core or multicore microprocessors and/or microcontrollers) and is used to control the operation of mobile communication device 300. The processor 306 can execute a variety of programs in response to program code or computer-readable code stored in the system memory 302 and can maintain multiple concurrently executing programs or processes.

The long range antenna 316 may include one or more RF transceivers and/or connectors that can be used by mobile communication device 300 to communicate with other devices and/or to connect with external networks. The user interface 308 can include any combination of input and output elements to allow a user to interact with and invoke the functionalities of mobile communication device 300. The short range antenna 314 may be configured to communicate with external entities through a short range communication medium (e.g., using Bluetooth, Wi-Fi, infrared, NFC, etc.). The long range antenna 316 may be configured to communicate with a remote base station and a remote cellular or data network, over the air.

The system memory 302 can be implemented using any combination of any number of non-volatile memories (e.g., flash memory) and volatile memories (e.g., DRAM, SRAM), or any other non-transitory storage medium, or a combination thereof media. The system memory 302 may store computer code, executable by the processor 306, for performing any of the functions described herein.

The system memory 302 may also store an application 302A (such as the above described vehicle application), a voice assistant module 302B, an authentication module 302C, credentials and/or tokens 302D, and an operating system 302E, The application 302A may include instructions or code interacting with a vehicle and a server computer associated with a manufacturer of the vehicle. The voice assistant module 302B may comprise code, executable by the processor 306, to receive voice segments, and generate and analyze data corresponding to the voice segments. The authentication module 302C may comprise code, executable by the processor 306, to authenticate a user. This can be performed using user secrets (e.g., passwords) or user biometrics.

System memory 302 may also store credentials and/or tokens 302D. Credentials may also include information identifying the mobile communication device 300 and/or the user of the mobile communication device 300.

The system memory 302 may also comprise a computer readable medium comprising code, executable by the processor 306 for performing operations including: providing, to a vehicle, a credential or token, wherein the credential or the token was previously received from a server computer; and performing an offline data authentication process with the vehicle.

Figure 4:
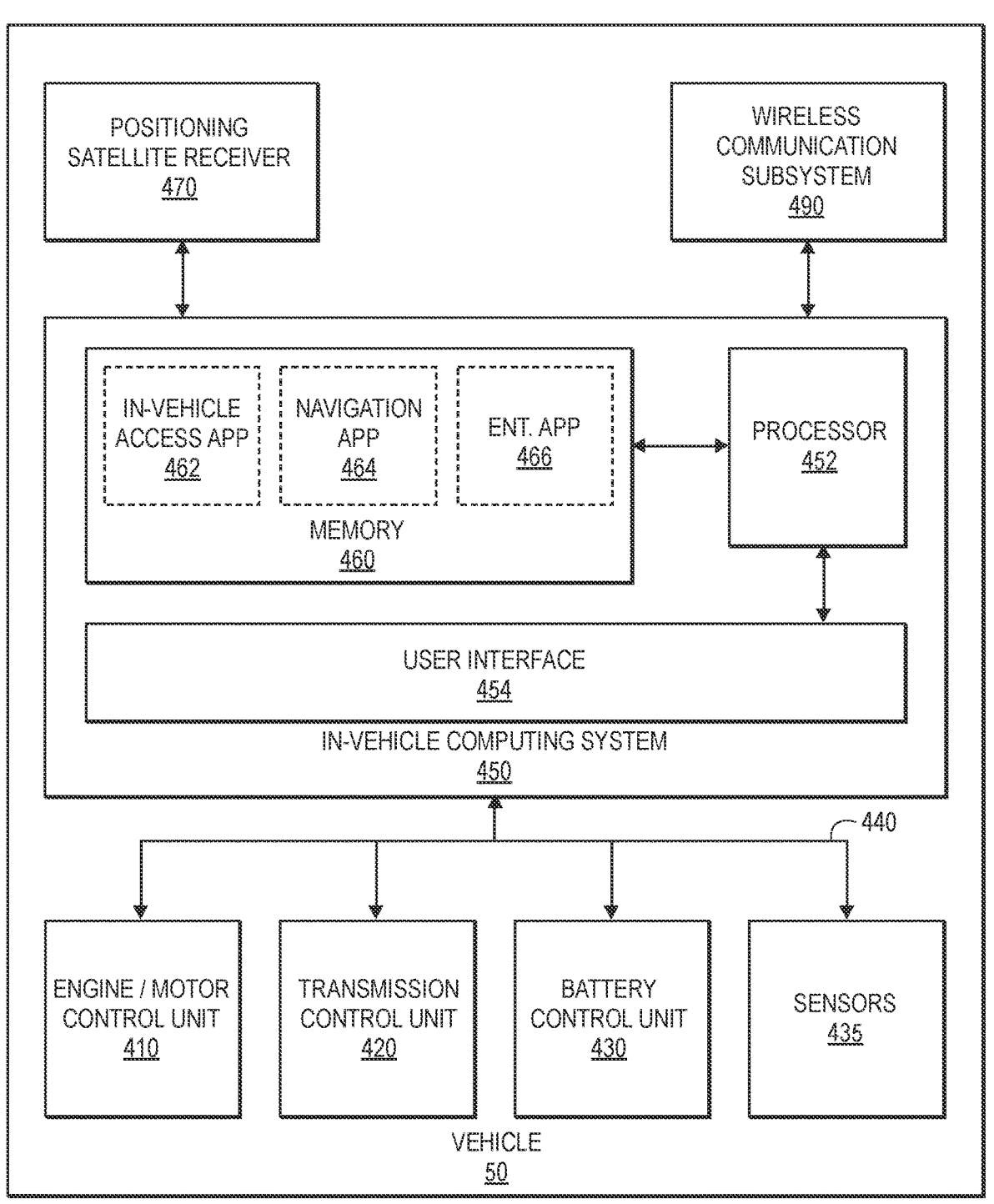
FIG. 4 shows a block diagram of a vehicle according to an embodiment.

FIG. 4 illustrates a block diagram of a vehicle 50, according to some embodiments. Vehicle 50 can be powered by a gasoline engine, an electric or hybrid-electric engine, a fuel cell, or other types of motor engines or energy sources. Although vehicle 50 may be described as an automobile, it should be understood that in some embodiments, the techniques described herein can also be applied to other types of vehicles such as motorcycles, boats, aircrafts, or other types of powered machines that are used to transport a user from one location to another.

Vehicle 50 may include various electronic control units (ECUs) to operate and control the electrical system or other subsystems of vehicle 50, and may include sensors 435 that the ECUs can monitor. Each ECU may include a microcontroller and one or more memories (e.g., any combination of SRAM, EEPROM, Flash memories, etc.) to store one or more executable programs for the ECU. Examples of ECUs may include engine/motor control unit 410, transmission control unit 420, and battery control unit 430, etc. In some embodiments, vehicle 50 may include additional ECU(s) not specifically shown, omit one or more ECUs, and/or integrate any of the functionalities of different ECUs into a single ECU.

Engine/motor control unit 410 may control the actuators, valves, motor, and/or other components of the engine of vehicle 50, or an electric motor of the vehicle 50. Transmission control unit 420 may control the gear shifting and the transmission modes (e.g., park, drive, neutral, reverse) of vehicle 50. Battery control unit 430 may control the electrical voltage and current supplied by a battery to the various components of vehicle 50. Sensors 435 may include vehicle speed sensors (e.g., wheel sensors) to detect the speed of vehicle 50, temperature sensors to detect the operating temperature of the vehicle's various components, air sensors to detect oxygen level in the engine, sensors to detect the amount of energy currently (e.g., electricity, gas, etc.) present with the vehicle, cameras to observe the surroundings of vehicle 50, etc. The various ECUs and sensors may communicate with one another via a vehicle communication bus 440. Examples of vehicle communication bus 440 may include a controller area network (CAN) bus, a local inter-connect network (LIN) bus, a vehicle area network (VAN) bus, or other suitable signal buses for vehicle communication.

Vehicle 50 may also include various radio frequency (RF) transceivers to allow vehicle 50 to receive and transmit RF signals with other devices. For example, vehicle 50 may include a positioning satellite receiver 470 such as a GPS receiver to receive satellite signals that can be demodulated and decoded to determine the location of vehicle 50. The positioning satellite receiver 470 can be used by a positioning or navigation subsystem of vehicle 50 to perform routing and mapping functions.

Vehicle 50 may also include a wireless communication subsystem 490 to enable network connectivity for vehicle 50. Wireless communication subsystem 490 may include one or more wireless transceivers that use WiFi, WiMax, or other types of wireless network communication protocols to connect vehicle 50 to an external network (e.g., the Internet) such that vehicle 50 can communicate with remote servers. Wireless communication subsystem 490 may also include one or more short or near range wireless transceivers such as RFID, Bluetooth or Bluetooth Low Energy, NFC, beacon, infrared transmitters and/or receivers that can be used to communicate with an access device in proximity to vehicle 50.

Vehicle 50 may also include an in-vehicle computing system 450 with which a user of vehicle 50 can interact. In-vehicle computing system 450 can be an infosystem, infotainment system, or other instrumentation system. In-vehicle computing system 450 can be mounted in the center console, dashboard, rear console, or other locations in vehicle 50 that is convenient for a user to access in-vehicle computing system 450. In some embodiments, in-vehicle computing system 450 can be coupled to vehicle communication bus 440 to receive vehicle status information from the ECUs and sensors 435.

In-vehicle computing system 450 may include a processor 452, a memory 460, and user interface 454. User interface 454 may include an input interface such as any number of buttons, knobs, microphone and/or a touchscreen that can receive user input, and an output interface such as a display (may be part of a touchscreen) and/or speakers. The display of user interface 454 can be integrated with the housing of in-vehicle computing system 450, or can be a separate component coupled to in-vehicle computing system 450 but mounted at a different location than in-vehicle computing system 450. For example, the display of user interface 454 can be mounted on the surface of the center console, on the dashboard, on the surface of the rear console, behind the headrest, on the interior ceiling, on the visor, or other suitable location in vehicle, and may display various types of information including information such as vehicle status information (e.g., speed, fuel economy, engine temperature, etc.), environmental information (e.g., inside/outside temperature, weather, etc.), navigation information (e.g., maps, routes, places of interests, etc.), entertainment such as videos or titles of audio selections or radio stations, energy level information (e.g., amount of charge present and needed to fill to capacity, amount of gas present and needed to fill to capacity), transaction information, energy terminal information, etc.

Memory 260 may include any combination of SRAM, DRAM, EEPROM, Flash, and/or other types of memories, etc. Memory 460 may store a number of applications such as in-vehicle access application 462, navigation application 464, entertainment application 466, and/or other applica-tions not specifically shown such as a climate control application. Entertainment application 466 may provide a user of vehicle 50 with video and/or audio entertainment. For example, entertainment application 466 can play a movie on user interface 454, play an audio track via user interface 454, or allow a user to tune to a radio station. The memory 260 may also store the credential or token, or derivative thereof, and any other data (e.g., a time limit for the use of the vehicle) from the server computer.

Navigation application 464 can be part of a positioning or navigation subsystem of vehicle 50, and may provide navigation functionalities such as mapping and routing functions. A user of vehicle 50 may input a desired location into in-vehicle computing system 450, and navigation application 464 can determine a current location of vehicle 50 using a positioning satellite receive 470, and provide directions to travel to the desired location. Navigation application 464 may display a map on user interface 454 and highlight a route to a desired destination. Navigation application 464 may also display nearby places of interests and/or nearby merchants on user interface 454.

In-vehicle access application 462 enables in-vehicle computing system 450 to interact with user device or the server computer. In some scenarios, in-vehicle access application 462 may allow a user of vehicle 50 to execute a transaction with the access device without requiring the user to exit vehicle 50, and without requiring the user to use another device such as the user's payment card or mobile device. In-vehicle access application 462 may store account credentials or tokens, or reference identifiers thereof for various accounts, allow a user to select a particular account, and transmit the account credentials or tokens (or references identifiers thereof) associated with the selected account to a user device and/or the server computer upon approval by the user.

The memory 460 can comprise a computer readable medium. The computer readable medium may comprise code, executable by the processor 452 to perform a method comprising: receiving, by a vehicle, a credential or token from a user device; determining, by the vehicle, that the credential or the token was previously received from a server computer; performing, by the vehicle, an offline data authentication process with the user device; and allowing access to the vehicle after the offline data authentication process is performed.

Figure 5:
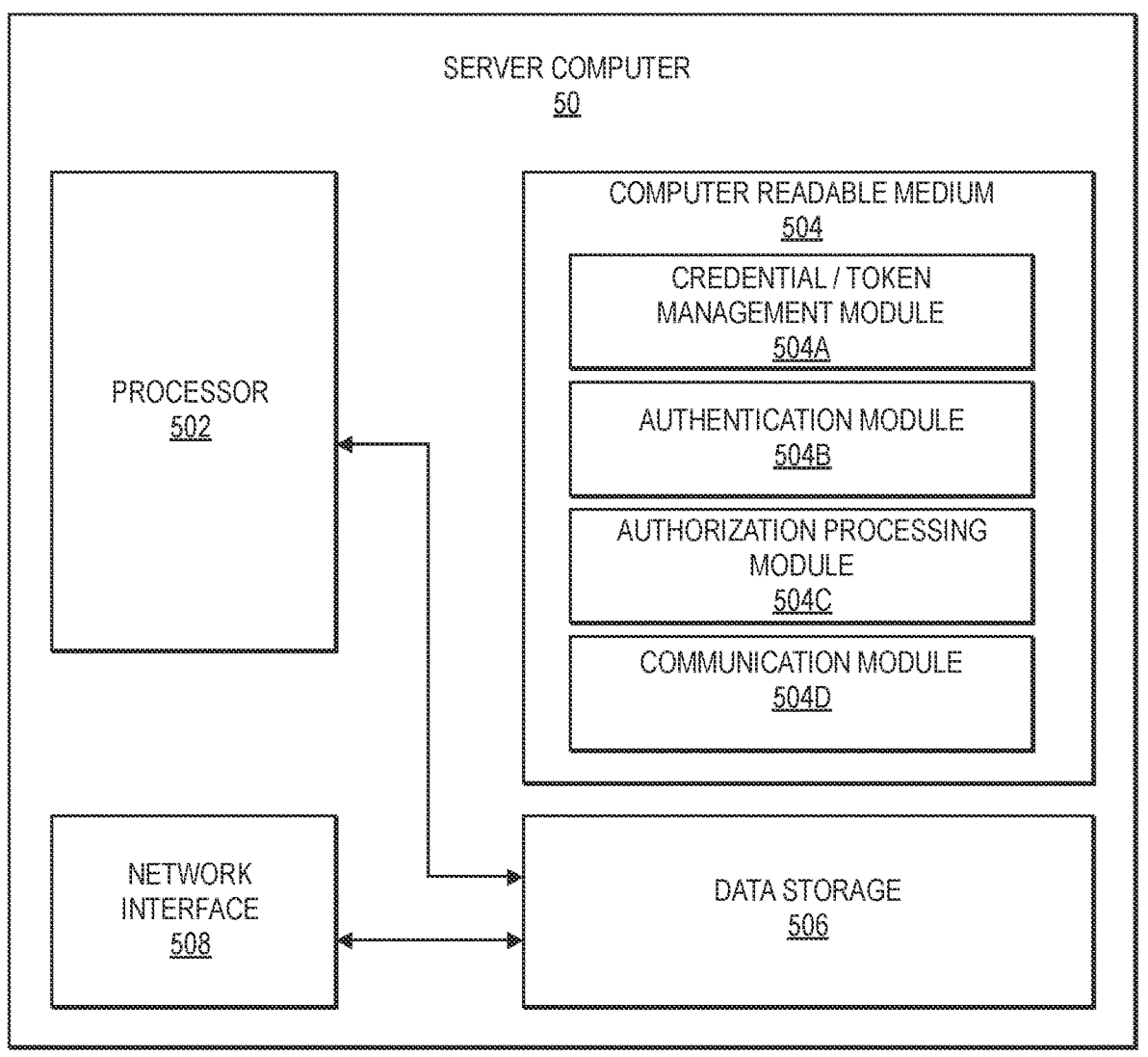
FIG. 5 shows a block diagram of a server computer according to an embodiment of the invention.

FIG. 5 shows a block diagram of a server computer 30 according to an embodiment. The Server computer 30 can comprise a processor 502, which may be coupled to a data storage 506 and a network interface 508. A computer readable medium 504 may also be operatively coupled to the processor 502. The data storage 506 can store any suitable data including but not limited to credentials and/or tokens, references to credentials and/or tokens, user data (e.g., usernames) or vehicle data (e.g., VINs) associated with the credentials or tokens, etc.

The computer readable medium 504 may comprise a number of software modules including a credential/token management module 504A, an authentication module 504B, an authorization processing module 504C, and a communication module 504D.

The credential/token management module 504A may comprise code that causes the processor 502 to retrieve credentials or tokens from the data storage 506 in response to receiving credential or token identifiers. The credential/token management module 504A may also comprise code that causes the processor 502 to receive and store credentials and/or tokens in the data storage 506. The credentials and/or tokens can be stored in conjunction with communication data (e.g., e-mail, phone number, etc.) associated with the users of the credentials and/or tokens, as well as vehicle information (e.g., VINs).

The authentication module 504B may comprise code that causes the processor 502 to authenticate users, user devices, or vehicles used by users, before processing transactions.

The authorization processing module 504C may comprise code that causes the processor 502 to perform authorization processing. Authorization processing can include generating and transmitting authorization request messages or providing instructions to generate and transmit authorization request messages, receiving authorization response messages, and generating notifications relating to transaction authorizations or declines. Authorizing processing can also including gathering data for an authorization and transmitting it to another computer.

The communication module 504D can comprise code that causes the processor 502 to communicate with various communication devices and applications on those communication devices.

The computer readable medium comprises code, executable by the processor 502, for performing operations comprising: receiving, from a first communication device, an access request message comprising a second user identifier from a first user to access a vehicle associated with a second user; transmitting, an authorization request message comprising a credential or a token associated with the first user to an authorizing entity computer; receiving, from the authorizing entity computer, an authorization response message; and responsive to receiving the authorization response message, transmitting the credential or the token to the vehicle, wherein the first user is able to access the vehicle by presenting a user device that contains the credential or token to the vehicle.

Embodiments of the invention have several advantages. Embodiments of the invention can a first user to access a vehicle, such as one owned by a second user, using a user device that has been authorized and validated. Embodiments can allow users to allow other users to use their vehicles in a secure and efficient manner. Separate key fobs for the vehicles need not be transferred from the owners of vehicles to those who wish to use them. Further, the access token that can be used to access the vehicles can be existing cards such as existing payment cards, thus dispensing with the need to create and deliver separate cards. Users can access the vehicles of other users even though they may be remotely located with respect to each other. This can be particularly useful in situations such as when loaning vehicles to friends, lessees, valets, etc.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:

receiving, by a server computer from a first communication device, an access request message comprising a second user identifier from a first user to access a vehicle, the vehicle associated with a second user;

transmitting, by the server computer an authorization request message comprising a credential or a token associated with the first user to an authorizing entity computer;

receiving, by the server computer from the authorizing entity computer, an authorization response message; and responsive to receiving the authorization response message, transmitting, by the server computer the credential or the token to the vehicle, wherein the first user is able to access the vehicle by presenting a user device that contains the credential or token to the vehicle, wherein the vehicle receives the credential or token from the user device, and the vehicle automatically grants access to the vehicle to the second user in response to receiving the credential or token in an offline dynamic authentication process, the offline dynamic authentication process comprising:

transmitting, by the vehicle to the user device, dynamic data, wherein the user device cryptographically signs the credential or token and the dynamic data with a user device private key to form a dynamic digital signature; and verifying, by the vehicle, the dynamic digital signature with a user device public key corresponding to the user device private key.

2. The method of claim 1, wherein the vehicle is a car and the user device is a mobile phone.

3. The method of claim 1, further comprising:

transmitting, by the server computer, a request to approve use of the vehicle to a second communication device operated by the second user; and receiving, by the server computer, a response to the request to approve the use of the vehicle from the second communication device.

4. The method of claim 1, further comprising:

transmitting, by the server computer, a credential request message to the first communication device; and receiving, by the server computer, a credential response message comprising the credential or token, and driver's license and insurance data, from the first communication device.

5. The method of claim 1, wherein the authorization request message comprises the credential.

6. The method of claim 1, wherein the vehicle receives an authorizing entity public key certificate from the user device, and extracts an authorizing entity public key from the authorizing entity public key certificate, and wherein the vehicle receives a user device public key certificate from the user device, verifies the user device public key certificate using the authorizing entity public key, and extracts the user device public key from the user device public key certificate.

7. The method of claim 6, wherein the vehicle receives a certificate authority public key from a certificate authority computer, and wherein the vehicle uses the certificate authority public key to verify the authorizing entity public key certificate before extracting the authorizing entity public key from the authorizing entity public key certificate.

8. The method of claim 1, wherein the vehicle and the user device communicate via NFC.

9. The method of claim 8, wherein the user device is a card.

10. The method of claim 1, wherein the first communication device is a mobile phone and the user device is a card.

11. The method of claim 1, wherein the first communication device and the user device are the same.

12. The method of claim 1, wherein the first user is remotely located with respect to the second user.

13. A system comprising:

one or more processors; and one or more computer readable media comprising code, executable by the one or more processors, for performing a method comprising:

receiving, from a first communication device, an access request message comprising a second user identifier from a first user to access a vehicle, the vehicle associated with a second user;

transmitting an authorization request message comprising a credential or a token associated with the first user to an authorizing entity computer;

receiving, from the authorizing entity computer, an authorization response message; and responsive to receiving the authorization response message, transmitting, the credential or the token to the vehicle, wherein the first user is able to access the vehicle by presenting a user device that contains the credential or token to the vehicle, wherein the vehicle is programmed to receive the credential or token from the user device, and automatically grant access to the vehicle to the second user in response to receiving the credential or token in an offline dynamic authentication process, the offline dynamic authentication process comprising:

transmitting, by the vehicle to the user device, dynamic data, wherein the user device cryptographically signs the credential or token and the dynamic data with a user device private key to form a dynamic digital signature; and verifying, by the vehicle, the dynamic digital signature with a user device public key corresponding to the user device private key.

14. A method comprising:

receiving, by a vehicle, a credential or token from a user device;

determining, by the vehicle, that the credential or the token was previously received from a server computer;

performing, by the vehicle, an offline data authentication process with the user device; and allowing access to the vehicle after the offline data authentication process is performed, wherein the offline data authentication process comprises:

transmitting, by the vehicle to the user device, dynamic data, wherein the user device cryptographically signs the credential or token and the dynamic data with a user device private key to form a dynamic digital signature; and verifying, by the vehicle, the dynamic digital signature with a user device public key corresponding to the user device private key.

15. The method according to claim 14, wherein the vehicle receives the credential.

16. The method of claim 14, wherein the method is performed when the vehicle is a car.

17. The method of claim 14, wherein the user device is a card.

18. The method of claim 17, wherein the card is a payment card.

19. The method of claim 1, wherein the authorization request message comprises the credential, and the credential is transmitted by the server computer to the vehicle, the credential being a credit card or debit card number.

20. The method of claim 1, wherein the authorization request message comprises the token, and the token is transmitted by the server computer to the vehicle, the token being a payment token.

* * * * *